(12) United States Patent
Wong

(10) Patent No.: US 10,305,348 B2
(45) Date of Patent: May 28, 2019

(54) VERTICAL MAGNETIC TRANSMISSION ASSEMBLY AND ENERGY-SAVING GENERATOR WITH THE SAME

(71) Applicant: Shou-Cheng Wong, Kaohsiung (TW)

(72) Inventor: Shou-Cheng Wong, Kaohsiung (TW)

( * ) Notice: Subject to any disclaimer, the term of this patent is extended or adjusted under 35 U.S.C. 154(b) by 279 days.

(21) Appl. No.: 15/491,664

(22) Filed: Apr. 19, 2017

(65) Prior Publication Data

US 2017/0366065 A1    Dec. 21, 2017

(30) Foreign Application Priority Data

Jun. 17, 2016    (TW) .............................. 105209102 U

(51) Int. Cl.
    *H02K 7/09* (2006.01)
    *H02K 7/02* (2006.01)
    *F16C 32/04* (2006.01)

(52) U.S. Cl.
    CPC ........... *H02K 7/09* (2013.01); *F16C 32/0406* (2013.01); *F16C 32/0408* (2013.01);
(Continued)

(58) Field of Classification Search
    CPC ............ H02K 7/09; H02K 7/02; H02K 7/025; H02K 21/027; H02K 2205/03; H02K 2213/09; F16C 32/0406; F16C 32/0408; F16C 32/041; F16C 32/0421; F16C 32/0423; F16C 32/0429; F16C 32/0431; F16C 32/0459; F16C 32/0461;
(Continued)

(56) References Cited

U.S. PATENT DOCUMENTS

| 4,320,927 A * | 3/1982 | Sertich ..................... A61C 1/05 310/90.5 |
| 4,340,260 A * | 7/1982 | Forster ................ F16C 32/0429 310/90.5 |

(Continued)

FOREIGN PATENT DOCUMENTS

| CN | 103270677 A | 8/2013 |
| CN | 104806444 A | 7/2015 |

(Continued)

OTHER PUBLICATIONS

English abstract translation of CN104806444A.
(Continued)

*Primary Examiner* — Bernard Rojas
*Assistant Examiner* — Ahmed Elnakib
(74) *Attorney, Agent, or Firm* — WPAT, PC

(57) ABSTRACT

A vertical magnetic transmission assembly includes a shelf, a transmission shaft, multiple magnetic modules and a weight. The shelf has multiple boards disposed along a longitudinal direction of the shelf. The magnetic modules are respectively mounted in multiple through holes formed in the boards. The transmission shaft with the weight rotates along the longitudinal direction of the shelf without friction by magnetic force between the magnetic modules and the magnets of transmission shaft. Therefore, the rotation speed or the torsion of the transmission shaft will be increased in use. An energy-saving generator is further combined with the vertical magnetic transmission assembly to reduce the energy loss in the energy transfer process and to save energy.

7 Claims, 6 Drawing Sheets

(52) U.S. Cl.
CPC ...... *F16C 32/0421* (2013.01); *F16C 32/0429* (2013.01); *H02K 7/025* (2013.01); *Y02E 60/16* (2013.01)

(58) Field of Classification Search
CPC .............. F16C 32/0474; F16C 32/0476; F16C 32/0478; F16C 32/0489; F16C 32/0491; F16C 32/0493; F16C 32/0495; F16C 32/0497; F16C 32/04; F16C 32/00
USPC .................................................. 310/90.5, 90
See application file for complete search history.

(56) References Cited

U.S. PATENT DOCUMENTS

| | | | | |
|---|---|---|---|---|
| 4,688,998 | A * | 8/1987 | Olsen | F04D 1/006 415/900 |
| 4,956,571 | A * | 9/1990 | Gordon | F16C 32/0438 310/10 |
| 5,010,722 | A * | 4/1991 | Yamaguchi | D01H 7/56 57/124 |
| 5,321,329 | A * | 6/1994 | Hovorka | F16C 39/063 310/90.5 |
| 5,831,362 | A * | 11/1998 | Chu | F16C 32/0438 310/90.5 |
| 6,015,272 | A * | 1/2000 | Antaki | F04D 3/02 415/900 |
| 6,124,658 | A * | 9/2000 | Coenen | D01H 4/12 310/90 |
| 6,359,357 | B1 * | 3/2002 | Blumenstock | F16C 32/0465 310/90.5 |
| 2001/0036565 | A1 * | 11/2001 | Jennings | F16C 32/0493 429/10 |
| 2003/0197439 | A1 * | 10/2003 | Kuipers | F16C 39/063 310/90.5 |
| 2005/0264118 | A1 * | 12/2005 | Kascak | F16C 32/0493 310/90.5 |
| 2012/0187922 | A1 * | 7/2012 | Dubois | F16F 15/305 322/4 |
| 2017/0366065 | A1 * | 12/2017 | Wong | H02K 7/09 |
| 2018/0069452 | A1 * | 3/2018 | Wong | H02K 1/2793 |
| 2018/0115233 | A1 * | 4/2018 | Wong | F16C 32/0408 |
| 2018/0351446 | A1 * | 12/2018 | Wong | H02K 53/00 |

FOREIGN PATENT DOCUMENTS

| | | | |
|---|---|---|---|
| JP | S5663117 | * | 5/1981 |
| TW | M372395 | | 1/2010 |
| TW | 201310871 A | | 3/2013 |
| TW | 201347392 A | | 11/2013 |

OTHER PUBLICATIONS

English abstract translation of CN103270677A.
English abstract translation of TW201310871A.
English abstract translation of M372395.
English abstract translation of TW201347392A.

* cited by examiner

VERTICAL MAGNETIC TRANSMISSION ASSEMBLY AND ENERGY-SAVING GENERATOR WITH THE SAME

BACKGROUND OF THE INVENTION

1. Field of the Invention

The present invention relates to an energy-saving generator, and more particularly to a vertical magnetic transmission assembly that can reduce friction loss by magnetic force for transmission purposes, and to an energy-saving generator that can save energy by using the vertical magnetic transmission assembly.

2. Description of Related Art

A conventional transmission assembly includes a base and a transmission shaft mounted through the base. A bearing is mounted between the base and the transmission shaft to reduce the friction between the base and the transmission shaft. In addition, lubricating oil is added into the bearing for reducing the friction when necessary. However, the friction between the parts of the transmission assembly cannot be eliminated completely by the bearing or the lubricating oil, so the energy in transmission will be lost due to the friction. Therefore, when a power source and a power input are connected by the transmission assembly, the energy will be lost and cannot be delivered fully.

Furthermore, the transmission assembly is a necessary part for a generator, so kinetic energy delivered from the power source to the generator are mainly transferred by the transmission assembly. The kinetic energy is lost during the transmission by the friction, which is generated in the transmission assembly, so the kinetic energy cannot be converted to the electrical energy fully. For this reason, the electrical energy generated by the conventional generator combined with the conventional transmission assembly is insufficient.

To overcome the shortcomings of the conventional transmission assembly and the generator, the present invention provides a vertical magnetic transmission assembly and an energy-saving generator with the vertical magnetic transmission assembly to mitigate or obviate the aforementioned problems.

SUMMARY OF THE INVENTION

The main objective of the present invention is to provide a vertical magnetic transmission assembly.

The vertical magnetic transmission assembly includes a shelf, a transmission shaft, multiple magnetic modules, and a weight. The shelf has multiple boards disposed along a longitudinal direction of the shelf. The magnetic modules are respectively mounted in multiple through holes formed in the boards.

The transmission shaft with the weight rotates along the longitudinal direction of the shelf without friction by magnetic force between the magnetic modules and the magnets of transmission shaft. Therefore, the rotation speed or the torsion of the transmission shaft will be increased in use.

An energy-saving generator is further combined with the vertical magnetic transmission assembly to reduce the energy loss in the energy transfer process and to save energy.

Other objects, advantages, and novel features of the invention will become more apparent from the following detailed description when taken in conjunction with the accompanying drawings.

DETAILED DESCRIPTION OF PREFERRED EMBODIMENT

Figure 1:
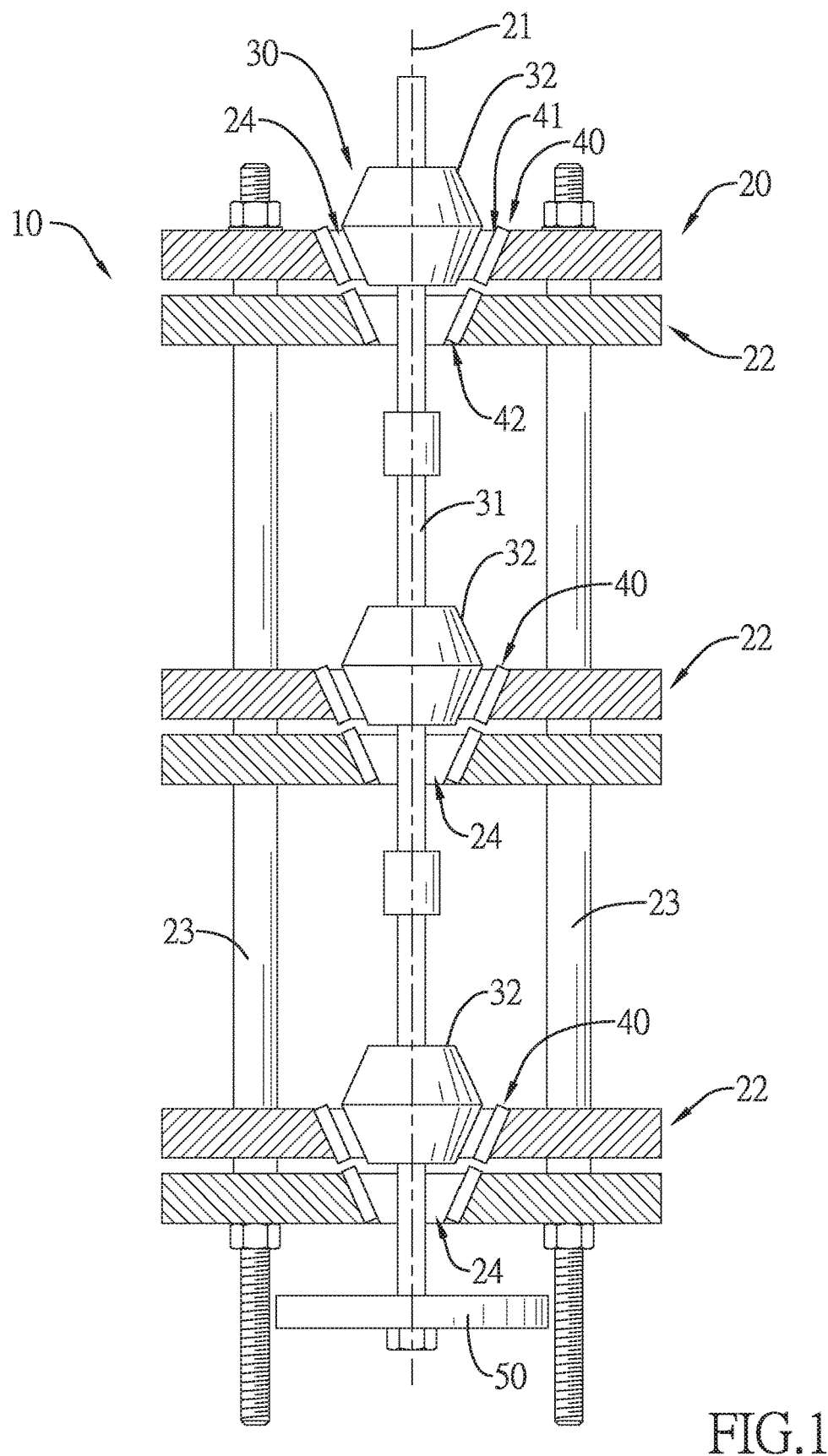
FIG. 1 is a side view in partial section of a vertical magnetic transmission assembly in accordance with the present invention.

With reference to FIG. 1, a preferred embodiment of a vertical magnetic transmission assembly 10 includes a shelf 20, a transmission shaft 30, multiple magnetic modules 40, and a weight 50.

Figure 2:
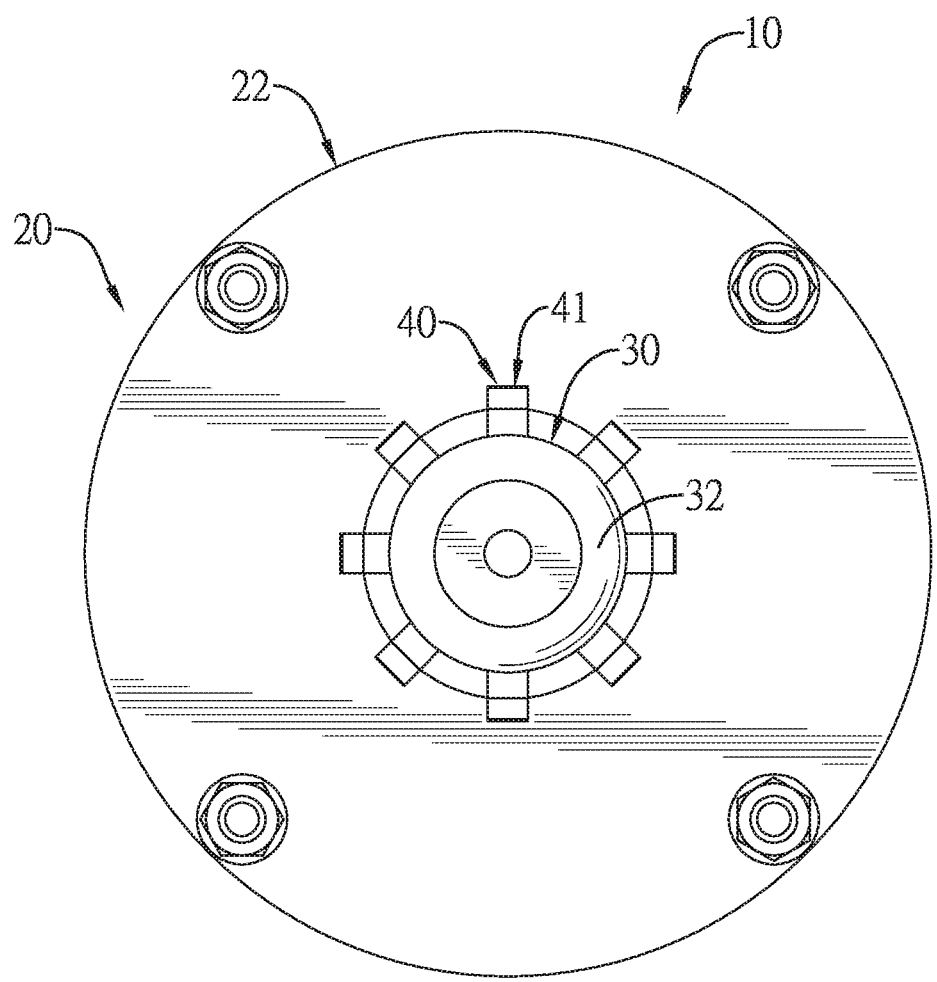
FIG. 2 is an enlarged top view of the vertical magnetic transmission assembly in FIG. 1.
Figure 3:
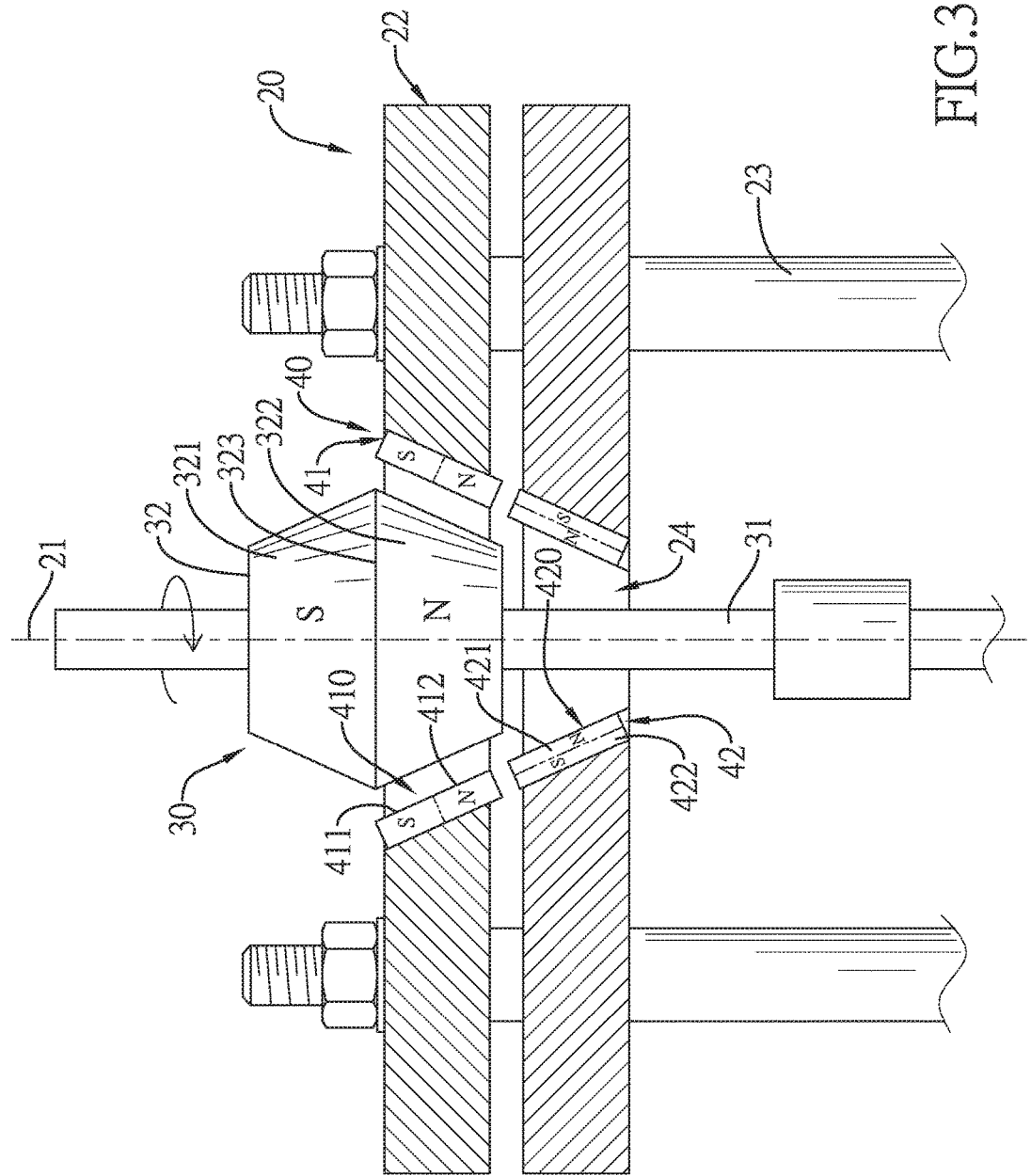
FIG. 3 is an enlarged side view in partial section of the vertical magnetic transmission assembly in FIG. 1.

With reference to FIGS. 1 to 3, the shelf 20 includes an axis 21, multiple boards 22, and multiple shelf rods 23. The axis 21 is longitudinally defined in the shelf 20 and is perpendicular to the boards 22. The boards 22 are separately disposed along a longitudinal direction of the shelf 20 and are supported by the shelf rods 23. Each board 22 can be a single plate or be combined by multiple plates. Each board 22 has a through hole 24 formed through the board 22 and the axis 21 is defined as the center of the through hole 24. The through holes 24 of the boards 22 are tapered holes, that is, a diameter of the through holes 24 gradually decreases along the axis 21. The through holes 24 can be a conical hole or a pyramidal hole. Preferably, each board 22 is combined by two plates at a spaced interval. The through holes 24 are respectively formed through the two plates of the boards 22.

With reference to FIGS. 1 to 3, the transmission shaft 30 is longitudinally mounted through the shelf 20 and includes a shaft body 31 and multiple magnets 32. The shaft body 31 can be a single rod or be combined by multiple rods. The magnets 32 are permanent magnets, are fixed around the shaft body 31, and are respectively and partially located in the through holes 24.

Each magnet 32 has an upper magnetic segment 321 and a lower magnetic segment 322 connected with the upper magnetic segment 321. The upper magnetic segment 321 and the lower magnetic segment 322 are symmetrical to each other and can be conical or pyramidal. Dimensions of the upper magnetic segment 321 gradually increase from top to bottom. Dimensions of the lower magnetic segments 322 gradually decrease from top to bottom. A borderline 323 is defined as a boundary between the upper magnetic segment 321 and the lower magnetic segment 322. The borderline 323 can be circular or regular polygonal.

Preferably, the upper magnetic segment 321 and the lower magnetic segment 322 are conical and the borderline 323 is circular. The diameter of each magnet 32 is larger at the borderline 323 than at two ends of the magnet 32. The diameters of each magnet 32 at the two ends along the longitudinal direction are equal to each other. The magnetic poles of the upper magnetic segment 321 and the lower magnetic segment 322 are of unlike poles. Thus, when the upper magnetic segment 321 is S pole, the lower magnetic segment 322 is N pole. The lower magnetic segments 322 of the magnets 32 respectively extend into the adjacent through holes 24 of the boards 22 of the shelf 20. The upper magnetic segments 321 of the magnets 32 respectively extend out from the adjacent through holes 24 of the boards 22 of the shelf 20. An angle is defined between an outer surface of the upper magnetic segment 321 and the axis 21 or between an outer surface of the lower magnetic segment 322 and the axis 21. The range of the angle is from 15 degrees to 75 degrees, wherein the preferable angle should be 30 degrees, 45 degrees or 60 degrees.

With reference to FIGS. 1 to 3, the magnetic modules 40 are respectively mounted in the through holes 24 of the boards 22 of the shelf 20. Each magnetic module 40 includes a first magnetic unit 41 and a second magnetic unit 42. The first magnetic unit 41 and the second magnetic unit 42 are mounted in the through hole 24 at vertical intervals. A gap is formed between the magnetic module 40 and each respective one of the magnet 32, wherein the first magnetic unit 41 is located at a top segment of the through hole 24, and the second magnetic unit 42 is located at a bottom segment of the through hole 24. Each magnet 32 is levitated by magnetic force of each magnetic module 40, wherein the lower magnetic segment 322 of each magnet 32 is located adjacent to the corresponding first magnetic unit 41 and the corresponding second magnetic 42 without contact. An outer surface of the first magnetic unit 41 and an outer surface of the second magnetic unit 42 are parallel to the outer surface of the lower magnetic segment 322 of each magnet 32, wherein gaps are formed between the first magnetic unit 41 and the lower magnetic segment 322 and between the second magnetic unit 42 and lower magnetic segment 322.

The transmission shaft 30 is levitated longitudinally in the shelf 20, so the gravity of the transmission shaft 30 is counteracted by the magnetic force of the magnetic modules 40 and the magnets 32 of the transmission shaft 30. The transmission shaft 30 is axially rotatable along the axis 21 of the shelf 20.

Because the first magnetic unit 41 and the second magnetic unit 42 are disposed conically or pyramidally in the through holes 24, a magnetic attraction and a magnetic repulsion are generated between the magnetic modules 40 and the transmission shaft 30 to keep the transmission shaft 30 longitudinally located at the axis 21 and to rotate stably.

With reference to FIGS. 1 to 3, each first magnetic unit 41 and each second magnetic unit 42 respectively have multiple permanent magnet blocks mounted around an inner surface of each through hole 24 at spaced intervals. Each one of the permanent magnet blocks of the first magnetic units 41 includes a first magnetic pole unit 410. Alternatively, each first magnetic unit 41 may have a conical permanent magnet having multiple first magnetic pole units 410 mounted around the permanent magnet. Each one of the permanent magnet blocks of the second magnetic units 42 includes a second magnetic pole unit 420. Alternatively, each second magnetic unit 42 may have a conical permanent magnet having multiple second magnetic pole units 420 mounted around the permanent magnet.

Figure 4:
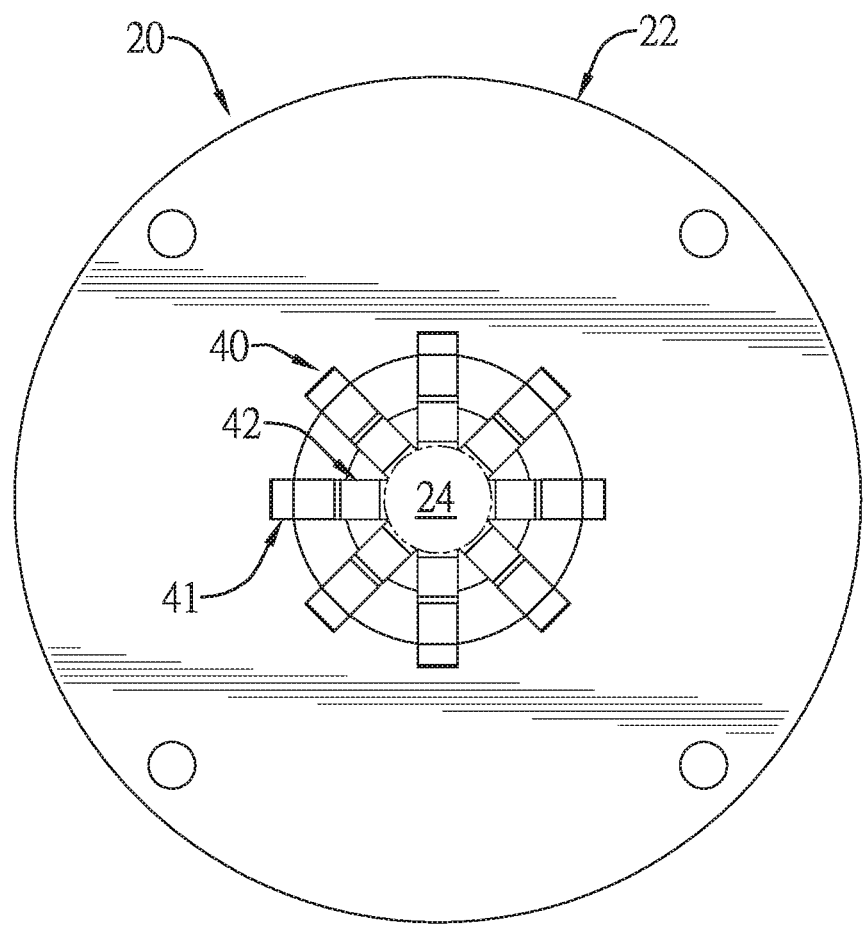
FIG. 4 is an enlarged top view of a shelf and magnetic modules of the vertical magnetic transmission assembly in FIG. 1.
Figure 5:
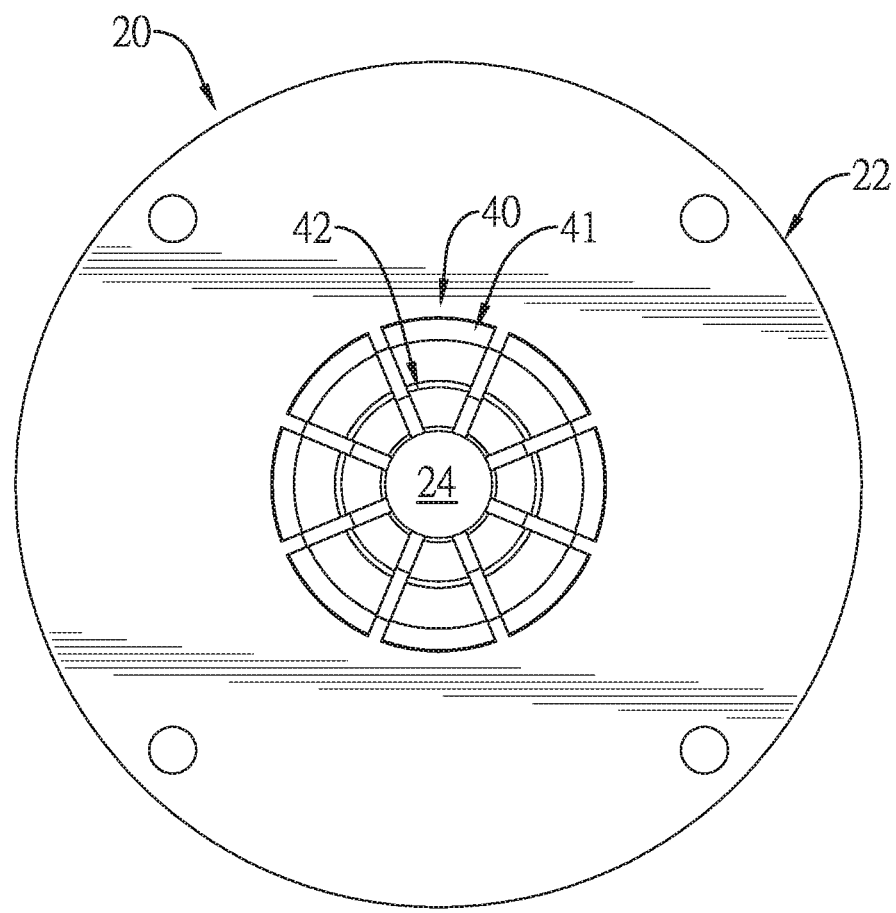
FIG. 5 is an enlarged bottom view of another preferred embodiment of the shelf and magnetic modules of the vertical magnetic transmission assembly in FIG. 1.

With reference to FIGS. 4 to 5, each first magnetic unit 41 and each second magnetic unit 42 respectively have multiple permanent magnet blocks mounted around an inner surface of each through hole 24 at spaced intervals. The permanent magnet blocks of each first magnetic unit 41 and each second magnetic unit 42 can be strips or sector blocks, are mounted around each through hole 24 and arranged as cone or pyramid to form a curvy or flat surface corresponding to the outer surface of each magnet 32. The permanent magnet blocks face toward the outer surface of each magnet 32 and are arranged parallel to the outer surface of the upper magnetic segment 321. The first magnetic pole units 410 and the second magnetic pole units 420 respectively face toward the outer surfaces of the magnets 32 to form an angle defined between the first magnetic pole units 410 and the axis 21. The range of the angle is 15 degrees to 75 degrees, wherein the preferable angle should be 30 degrees, 45 degrees or 60 degrees.

Each first magnetic pole unit 410 has a first pole 411 and a second pole 412 located under the first pole 41. The first pole 411 and the second pole 412 of each first magnetic pole unit are unlike magnetic poles. The first pole 411 of each first magnetic pole unit 410 and the magnetic pole of the lower magnetic segment 322 are unlike poles. The second pole 412 and the lower magnetic segment 322 are of like poles. The first pole 411 of each first magnetic pole unit 410 and the second pole 412 of each first magnetic pole unit 410 respectively provide a magnetic attraction force and the magnetic repulsive force with respect to the lower magnetic segment 322 of each magnet 32. Preferably, if the upper magnetic segment 321 of each magnet 32 is S pole and the lower magnetic segment 322 of each magnet 32 is N pole, the first pole 411 of each first magnetic pole unit 410 will be S pole and the second pole 412 of each first magnetic pole unit 410 will be N pole.

Each second magnetic pole unit 420 has a first pole 421 and a second pole 422 located behind the first pole 421. The first pole 421 of each second magnetic pole unit and the second pole 422 of each second magnetic pole unit are unlike poles. The first pole 421 of the each second magnetic pole unit 420 and the lower magnetic segment 322 are of like poles. The first pole 421 of each second magnetic pole unit 420 provides a magnetic repulsive force with respect to the lower magnetic segment 322 of each magnet 32. Preferably, if the upper magnetic segment 321 of each magnet 32 is S pole and the lower magnetic segment 322 of each magnet 32 is N pole, the first pole 421 of each second magnetic pole unit 420 will be S pole and the second pole 422 of each second magnetic pole unit 420 will be N pole.

With reference to FIG. 1, the weight 50 is fixed on a bottom of the shaft body 31 of the transmission shaft 30. The weight 50 can be a round board or a conical board.

With reference to FIGS. 1 to 3, when the vertical magnetic transmission assembly 10 is in use, the transmission shaft 30 of the vertical magnetic transmission assembly 10 is connected between a power source and a power input. The transmission shaft 30 of the vertical magnetic transmission assembly 10 is levitated longitudinally in the shelf 20 by the magnetic effect of the magnetic modules 40, and the transmission shaft 30 can axially rotate along the axis 21 of the shelf 20. The vertical magnetic transmission assembly 10 can be set up in a vacuum environment to reduce the air resistance generated from the rotation of the transmission shaft 30 of the vertical magnetic transmission assembly 10.

When the angles between the lower magnetic segments 322 of transmission shaft 30 and the axis 21 are smaller than 45 degrees and when the angles between the first magnetic pole units 410 and the second magnetic pole units 420 respectively face toward the outer surfaces of the magnets 32 and the axis 21 are smaller than 45 degrees, the transmission shaft 30 endures a larger longitudinal magnetic force upwardly. It is suitable for a heavier transmission shaft 30 with low rotation speed.

When the said angles are larger than 45 degrees, the transmission shaft 30 endures a larger radial magnetic force. It is suitable for a lighter transmission shaft 30 with high rotation speed The transmission shaft 30 of the vertical magnetic transmission assembly 10 and the weight 50 fixed on the transmission shaft 30 are driven and are rotated to store energy until in a constant speed state, and the transmission shaft 30 and the weight 50 will keep rotating by the inertia. As the transmission shaft 30 and the shelf 20 have no contact and friction loss, the rotation speed or the torsion of the transmission shaft 30 of the vertical magnetic transmission assembly 10 will be increased in use.

Figure 6:
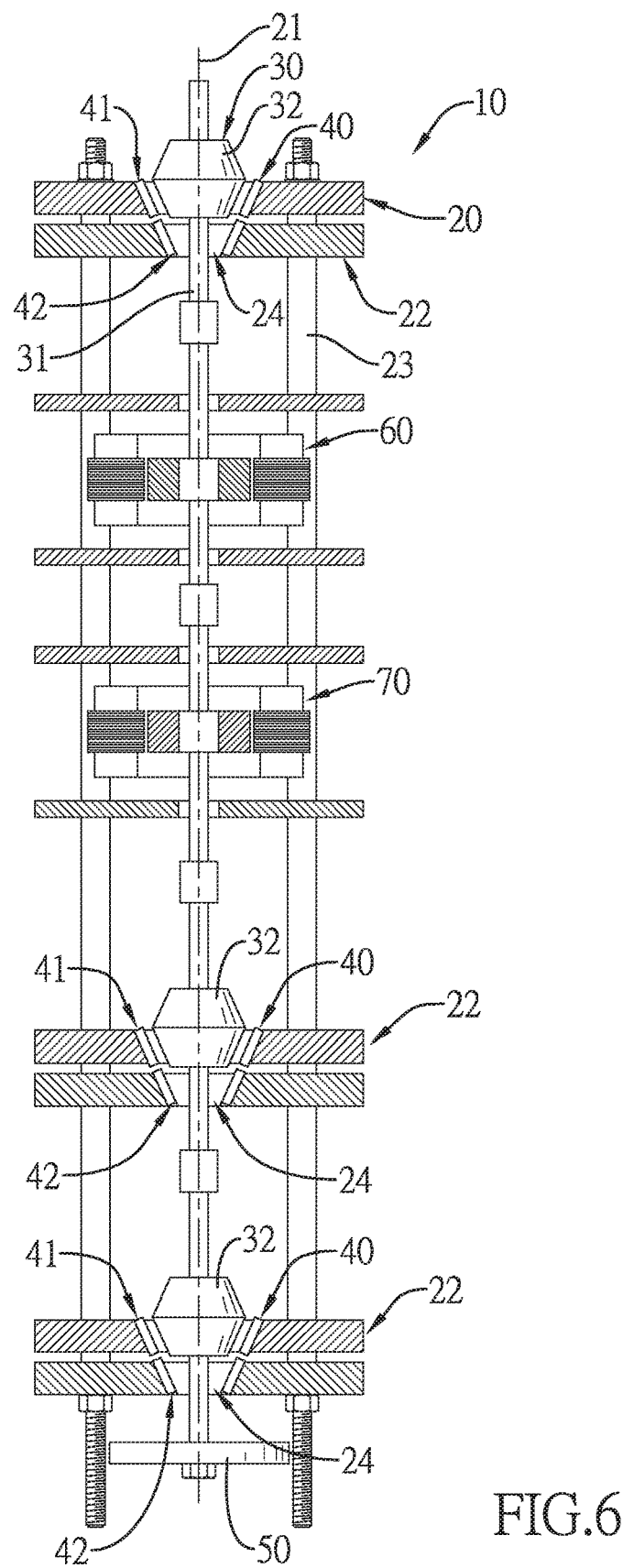
FIG. 6 is a side view in partial section of an energy-saving generator with the vertical magnetic transmission assembly in accordance with the present invention.

With the reference to FIG. 6, a preferred embodiment of an energy-saving generator includes the vertical magnetic transmission assembly 10, an electricity generating unit 60 and a supplemental power input unit 70.

The electricity generating unit 60 is mounted on one of the boards 22 of the shelf 20 and is connected with the shaft body 31 of the transmission shaft 30 by a connector. The electricity generating unit 60 can convert rotating kinetic energy to electricity.

The supplemental power input unit 70 is connected with the shaft body 31 of the transmission shaft 30 to provide a supplemental driving force to the rotation of the transmission shaft 30. The supplemental power input unit 70 can be a motor or an engine combined with a wheel transmission assembly.

The electricity generating unit 60 and the supplemental power input unit 70 can be replaced by an electrical generator which has electricity generating and rotation power output functions.

When the energy-saving generator is in use, the supplemental power input unit 70 drives the transmission shaft 30 of the vertical magnetic transmission assembly 10 and the weight 50 fixed on the transmission shaft 30 to rotate and store energy. The supplemental power input unit 70 stops providing power until the rotations of transmission shaft 30 and the weight 50 remain in a constant speed state. Then the transmission shaft 30 and the weight 50 will keep rotating by the inertia, and drive the electricity generating unit 60 connected with the transmission shaft 30 to convert the kinetic energy to electricity.

The transmission shaft 30 and the shelf 20 have no contact and friction loss because of the magnetic force effects generated between the transmission shaft 30 and the magnetic modules 40. The energy-saving generator can reduce the energy loss in the energy transfer process to save energy.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A vertical magnetic transmission assembly comprising:
a shelf including
an axis longitudinally defined in the shelf;
multiple shelf rods;
multiple boards separately disposed along a longitudinal direction of the shelf and supported by the shelf rods, each board having a through hole formed through the board and the axis being defined as the center of the through holes of the boards, the through holes being tapered with a diameter of the through holes gradually decreasing along the axis; and
a transmission shaft longitudinally mounted through the shelf and including
a shaft body; and
multiple magnets being permanent magnets, fixed around the shaft body, and respectively and partially located in the through holes, each magnet having
an upper magnetic segment, wherein a radial width of the upper magnetic segment gradually increase from top to bottom; and
a lower magnetic segment connected with the upper magnetic segment, wherein a radial width of the lower magnetic segment gradually decrease from top to bottom, and
a borderline defined as a boundary between the upper magnetic segment and the lower magnetic segment;
wherein, the upper magnetic segment and the lower magnetic segment are symmetrical in shape and are of unlike magnetic poles;
the lower magnetic segment of each magnet extends into the through hole of each board of the shelf, and the upper magnetic segment of each magnet extends out from the through hole of each board of the shelf; and
an angle is defined between an outer surface of the upper magnetic segment and the axis or between an outer surface of the lower magnetic segment and the axis, and the range of the angle is from 15 degrees to 75 degrees;
multiple magnetic modules respectively mounted in the through holes of the boards of the shelf and respectively located adjacent to the magnets of the transmission shaft to form a gap between each magnetic module and a respective one of the magnets, and each magnetic module including
a first magnetic unit and a second magnetic unit mounted in the through hole in a corresponding one of the boards at a vertical interval, the lower magnetic segment of each magnet located adjacent to the first magnetic unit in the through hole without contact and located adjacent to the second magnetic unit without contact,
wherein, the first magnetic unit of each magnetic module has multiple permanent magnet blocks mounted around an inner surface of the through hole of a corresponding one of the boards at intervals, each permanent magnet block includes a first magnetic pole unit having a first pole and a second pole located under the first pole, the first pole and the second pole of each first magnetic pole unit are unlike magnetic poles, the first pole and the lower magnetic segment are of unlike poles, and the second pole and the lower magnetic segment are of like poles; and
wherein, the second magnetic unit of each magnetic module has multiple permanent magnet blocks mounted around the inner surface of the through hole of a corresponding one of the boards at intervals, each permanent magnet block of the second magnetic unit includes a second magnetic pole unit having a first pole and a second pole located behind the first pole, and the first pole of each second magnetic pole unit and the lower magnetic segment are of like poles; and a weight fixed on a bottom of the shaft body of the transmission shaft.

2. The vertical magnetic transmission assembly as claimed in claim 1, wherein the permanent magnet blocks of the first magnetic units and the permanent magnet blocks of the second magnetic units are strips or sector blocks; and the permanent magnet blocks of the first magnetic units and the permanent magnet blocks of the second magnetic units each respectively form a curvy surface corresponding to outer surfaces of the magnets.

3. An energy-saving generator comprising:

the vertical magnetic transmission assembly as claimed in claim 1;

an electricity generating unit mounted on one of the boards of the shelf of the vertical magnetic transmission assembly and connected with the shaft body of the transmission shaft of the vertical magnetic transmission assembly by a connector; and a supplemental power input unit connected with the shaft body of the transmission shaft of the vertical magnetic transmission assembly.

4. The energy-saving generator as claimed in claim 3, wherein the supplemental power input unit is a motor or an engine combined with a wheel transmission assembly.

5. The energy-saving generator as claimed in claim 3, wherein the permanent magnet blocks of the first magnetic units and the permanent magnet blocks of the second magnetic unit are strips or sector blocks; and the permanent magnet blocks of the first magnetic units and the permanent magnet blocks of the second magnetic units each respectively form a curvy surface corresponding to outer surfaces of the magnets.

6. An energy-saving generator comprising:

the vertical magnetic transmission assembly as claimed in claim 1; and an electrical generator mounted on one of the boards of the shelf of the vertical magnetic transmission assembly and connected with the shaft body of the transmission shaft of the vertical magnetic transmission assembly by a connector.

7. The energy-saving generator as claimed in claim 6, wherein the permanent magnet blocks of the first magnetic units and the permanent magnet blocks of the second magnetic unit are strips or sector blocks; and the permanent magnet blocks of the first magnetic units and the permanent magnet blocks of the second magnetic unit each respectively form a curvy surface corresponding to outer surfaces of the magnets.

* * * * *